United States Patent [19]

Mitchell

[11] Patent Number: 4,969,769
[45] Date of Patent: Nov. 13, 1990

[54] JOINTS BETWEEN ELEMENTS

[75] Inventor: Samuel B. H. Mitchell, Wraysbury, United Kingdom

[73] Assignee: Charcon Tunnels Limited, London, England

[21] Appl. No.: 305,920

[22] Filed: Feb. 3, 1989

[30] Foreign Application Priority Data

Feb. 3, 1988 [GB] United Kingdom ............... 8802388
Feb. 4, 1988 [GB] United Kingdom ............... 8802486
Mar. 17, 1988 [GB] United Kingdom ............... 8806304

[51] Int. Cl.$^5$ ........................... F16B 2/00; F16J 15/00
[52] U.S. Cl. .................................... 403/288; 285/910; 277/215; 403/408.1; 403/364; 403/379
[58] Field of Search ............. 403/408.1, 288, 364, 403/378, 379; 285/335, 363, 347, 288, 910; 277/215, 222

[56] References Cited

U.S. PATENT DOCUMENTS 3,836,183  9/1974  Battle ................................ 285/363
3,930,656  1/1976  Jelink ................................ 285/363
3,937,478  2/1976  Manecebo ......................... 285/363
4,185,857  1/1980  Saracco ............................. 285/363
4,269,417  5/1981  Dutton .............................. 285/363
4,372,565  2/1983  Lien .................................. 285/363
4,784,411 11/1988  Tückmantel ..................... 285/363

FOREIGN PATENT DOCUMENTS 2004931  4/1979  United Kingdom .

Primary Examiner—Randolph A. Reese
Assistant Examiner—Carol I. Bordas
Attorney, Agent, or Firm—Cushman, Darby & Cushman

[57] ABSTRACT

Joints are provided between the members of a pair of elements, such as a pair of concrete tunnel lining segments which are secured together in compression by a fastening arrangement with a gasket between the end faces of the segments. The gasket has a multiplicity of spaced recesses or apertures to prevent the gasket from creating a surface tension in the end faces when the joint is subjected to compression.

1 Claim, 2 Drawing Sheets

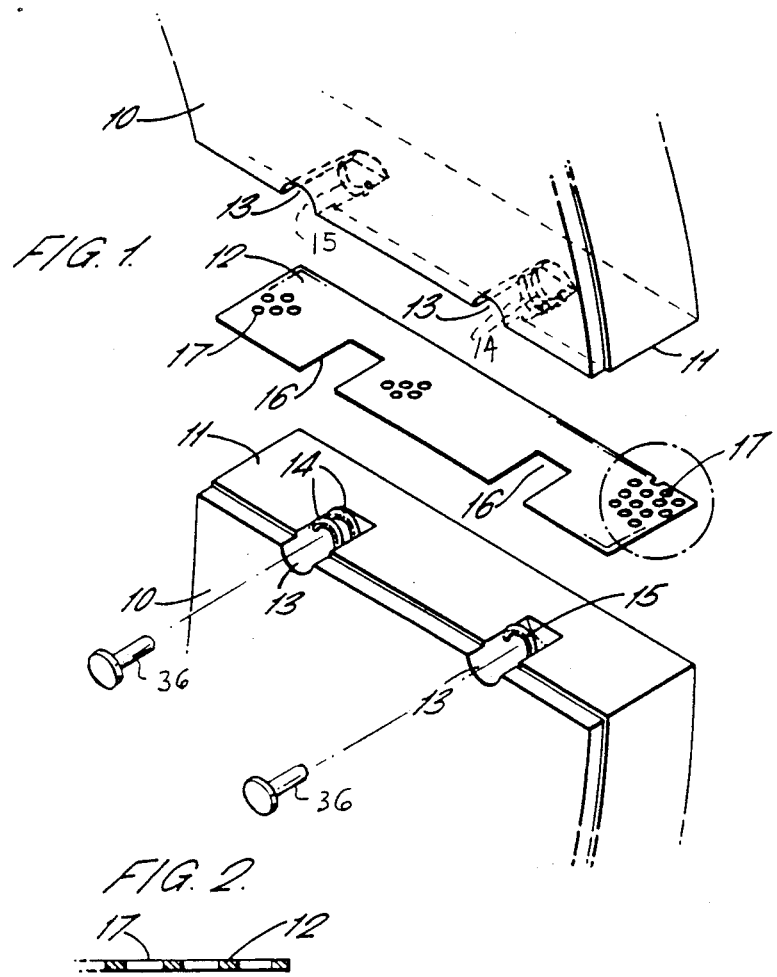

JOINTS BETWEEN ELEMENTS

BACKGROUND OF THE INVENTION

1. Field of the Invention

This invention relates to joints between elements at least one of which is formed from concrete such as joints between circumferential and axially extending edge faces of arcuate concrete tunnel lining segments.

2. Description of the Prior Art

U.K. Pat. Specification No. 2004931 (equivalent to U.S. Pat. No. 4,397,583, issued Aug. 9, 1983) discloses a joint between ends of a pair of arcuate concrete tunnel lining segments. The joint includes a gasket between the segment ends which are drawn together to compress the gasket. Damage to the surfaces of the segment ends can occur as a result of the compressive force applied to the joint.

SUMMARY OF THE INVENTION

The invention provides a joint between a pair of elements at least one of which is formed from concrete (e.g. arcuate concrete tunnel lining segments) comprising a gasket (or other packing) to engage between a pair of faces of the elements with the gasket in compression to provide a joint between the elements, wherein the gasket is formed with a plurality of apertures, recesses or surface projections in regions of the gasket which lie between the faces of the concrete elements to minimize application of any tensile force to said surface of the or each element when the gasket is compressed by said elements.

In the case where the elements are secured together by connecting means extending between said faces of the elements, further apertures may be provided in the gasket through which the connecting means may pass.

BRIEF DESCRIPTION OF THE DRAWINGS

FIG. 1 is a perspective view of a joint between two arcuate concrete lining segments embodying an apertured gasket;

FIG. 2 is a section through the encircled part of the gasket of FIG. 1;

FIG. 3 is a similar view to that of FIG. 2 showing a modified form of the gasket.

DESCRIPTION OF THE PREFERRED EMBODIMENTS

Figure 4:
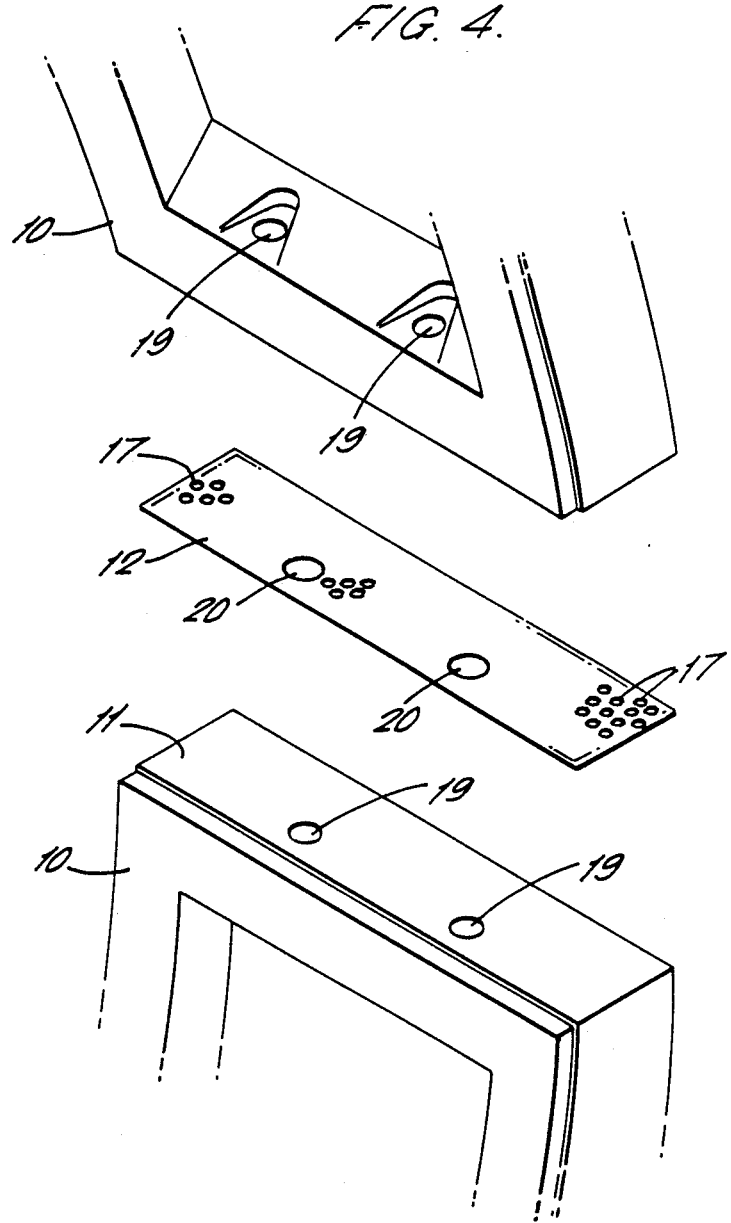
FIG. 4 is a similar view to that of FIG. 1 showing the invention applied to an alternative form of segment.

Referring firstly to FIGS. 1 and 2 the drawings, there is shown a pair of arcuate concrete tunnel lining segments 10 having a axially extending end faces 11 to be secured together with a bitumen or other similar material gasket 12 disposed between the faces.

The concrete elements are connected together by a system described and illustrated in U.K. Pat. Specification No. 2004931 and known as the "one pass" system. Briefly the system comprises pairs of semicylindrical recesses 13 cast in the end faces 11 of the segments and extending part way across the segment faces from the inner concave sides thereof. One of the semi-cylindrical recesses is bridged by an upstanding pair of hoops 14 and the other recesses bridged by a single upstanding hoop 15. The gasket 12 is formed with rectangular apertures 16 disposed to align with the recesses 13 when the two segments 10 are brought together and, the hoops on the respective segments project through the aperture 16 with the pair of hoops 14 receiving between them the single hoop 15 of the other segment, and vice versa. Expandable fastening device 36, disclosed in more detail in aforesaid U.K. Pat. Specification No. 2004931, are then driven through the overlapping hoops to clamp the segments with a substantial compressive force against the gasket 12 to create a seal joint between the segment faces.

The gasket 12 is formed with a multiplicity of apertures or recesses 17 shown in detail in FIG. 2 in the areas of the gasket which engage between the faces 11 of the segment spaced from the apertures 16 to prevent the gasket from creating a surface tension in the faces 11 of the concrete elements while under compression. The apertures or recesses also help to distribute compression when there is any unevenness in the surfaces of the concrete elements.

An alternative construction is shown in FIG. 3 in which the gasket has surface projections 18 on either side to serve the same purpose as the apertures 17.

As indicated above, the arrangement is particularly applicable to arcuate concrete tunnel lining segments and it is frequently the case that maximum compressive forces arise in the joints between such segments through ground loadings and not by mechanical joint fixings. For example, tunnels which are at great depths in poor ground or which have large buildings or railway lines or the like above them, have much greater loads to contend with than tunnels nearer the surface or which run through open ground. Any securing means between the segments may exert only a very small fraction of the compressive forces and the form of gasket indicated above for use between the adjacent faces of the segments is applicable whether or not securing means is provided.

FIG. 4 shows a further arrangement in which the segments 10 are secured together by bolts which pass through holes 19 in the segment ends and corresponding holes 20 in the gasket 12.

It will be appreciated that the invention is equally applicable to joints between pairs of elements in which only one of the pair is formed from concrete and the other is formed, for example, from steel, and, irrespective of the design or securing means or type of joint.

What is claimed is:

1. A joint, comprising:
   two elements to be joined, at least one of said elements being made of concrete, the two elements having two respective faces disposed in confronting relation to one another;
   a gasket interposed between said faces and having two opposite faces thereof disposed in facewise engagement with respective said faces of said two elements; and
   a joint tightening means connected with both said elements and drawing said elements towards one another and thereby compressing said gasket;
   said gasket having a plurality of widely distributed recess means formed in both of said opposite faces thereof between said faces of said two elements for preventing the gasket from creating a surface tension in said faces of said two elements while said gasket remains compressed;
   said recess means in one said face of said gasket interconnecting through said gasket with corresponding ones of said recess means in the other said face of said gasket, thereby providing respective apertures through said gasket.

* * * * *